United States Patent
Chang et al.

(10) Patent No.: US 9,535,466 B2
(45) Date of Patent: Jan. 3, 2017

(54) ELECTRONIC ASSEMBLY

(71) Applicant: Acer Incorporated, New Taipei (TW)

(72) Inventors: Yi-Mu Chang, New Taipei (TW);
Yan-Lin Kuo, New Taipei (TW);
Cheng-Nan Ling, New Taipei (TW);
Chun-I Chen, New Taipei (TW);
Hsien-Wei Chen, New Taipei (TW);
Yu-Shih Wang, New Taipei (TW);
Chen-Chih Hou, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 14/798,476

(22) Filed: Jul. 14, 2015

(65) Prior Publication Data

US 2016/0266616 A1    Sep. 15, 2016

(30) Foreign Application Priority Data

Mar. 10, 2015  (TW) .............................. 104107592 A (51) Int. Cl.
*G06F 1/16*  (2006.01)

(52) U.S. Cl.
CPC ........... *G06F 1/1683* (2013.01); *G06F 1/1632* (2013.01); *G06F 1/1654* (2013.01)

(58) Field of Classification Search
CPC ..... G06F 1/1654; G06F 1/1632; G06F 1/1683
USPC .................. 439/660; 361/679.26–679.29, 361/679.41–679.43
See application file for complete search history.

(56) References Cited

U.S. PATENT DOCUMENTS

| | | | | |
|---|---|---|---|---|
| 5,138,565 A | * | 8/1992 | Satou | G06F 1/1616 16/223 |
| 6,530,784 B1 | * | 3/2003 | Yim | G06F 1/1616 361/679.29 |
| 6,954,352 B2 | * | 10/2005 | Kuo | G06F 1/1601 248/917 |
| 2009/0141439 A1 | * | 6/2009 | Moser | G06F 1/1616 361/679.29 |
| 2012/0221870 A1 | * | 8/2012 | Zhao | G06F 1/1654 713/320 |

FOREIGN PATENT DOCUMENTS

| | | | | |
|---|---|---|---|---|
| CN | 203386106 | | 1/2014 | |
| FR | 2820791 A1 | * | 8/2002 | ........... G06F 1/1616 |
| TW | M243698 | | 9/2004 | |
| TW | 201433022 | | 8/2014 | |
| TW | 201445836 | | 12/2014 | |

\* cited by examiner

*Primary Examiner* — Nidhi Thaker
(74) *Attorney, Agent, or Firm* — Jianq Chyun IP Office (57) ABSTRACT

An electronic assembly including a first body having at least one recess, a first electronic module disposed within the first body, at least one first terminal set disposed within the recess and electrically connected to the first electronic module, a second body having at least one protruding portion, a second electronic module disposed within the second body and at least one second terminal set disposed in the protruding portion, partially exposed by the surface of the protruding portion and electrically connected to the second electronic module. The first and the second bodies are assembled to each other by the protruding portion inserting into the recess, and the first terminal set contacts the second terminal set, such that the first and the second electronic modules are electrically connected to each other through the first and the second terminal sets.

14 Claims, 10 Drawing Sheets

ELECTRONIC ASSEMBLY

CROSS-REFERENCE TO RELATED APPLICATION

This application claims the priority benefit of Taiwan application serial no. 104107592, filed on Mar. 10, 2015. The entirety of the above-mentioned patent application is hereby incorporated by reference herein and made a part of this specification.

BACKGROUND OF THE INVENTION

Field of the Invention

The invention is related to an electronic assembly.

Description of Related Art

The development of technologies brings enhanced functions (such as smart phones and tablet PC). The devices are provided with a touch screen for control information to be input in. However, the touch screen that is easy to be operated does not fully satisfy all the users' need. Moreover, a mobile communication device has the limitation of small display screen which usually causes inconveniences to the user during operation. In light of the above, an electronic assembly that integrates the mobile communication device with an external keyboard has been developed.

Generally, current external keyboards include a base and a keyboard structure as well as a supporting mechanism disposed on the base. The external keyboard uses the supporting mechanism which may pivot relative to the base to support the tablet PC. After the external keyboard and the tablet PC are combined with each other via a latch-like structure, the user may use the keyboard structure as an input interface for inputting control information. However, to keep a smooth electrical connection between the keyboard and the tablet PC, a pogo pin is normally disposed in the body of current external keyboard device used for supporting the tablet PC. The pogo pin is unable to be synchronically and accurately combined with the latch structure. For example, under the circumstances where the latch structure is latched due to structure tolerance or process tolerance whereas the pogo pin is unable to tightly contact the latch structure, or the pogo pin is deformed due to an excessive force applied after the latch structure is latched with the base. Furthermore, in most cases, the pogo pin is exposed by the surface of the machine body, which is likely to cause an unpleasing appearance.

Therefore, it remains to be an issue to be pondered by related persons to make devices to be structurally and electrically connected in a smooth manner.

SUMMARY OF THE INVENTION

The invention provides an electronic assembly composed of two bodies, in which terminal sets are disposed within a connection mechanism, such that the two bodies are electrically connected to each other in a smooth manner while they are structurally connected.

According to an embodiment of the invention, the electronic assembly includes a first body, a first electronic module, at least one first ten. Anal set, a second body, a second electronic module and at least one second terminal set. The first body has at least one recess. The first electronic module is disposed within the first body. The first terminal set is disposed in the recess and electrically connected to the first electronic module. The second body has at least one protruding portion. The second electronic module is disposed within the second body. The second terminal set is disposed in the protruding portion and the second terminal set is partially exposed by the surface of the protruding portion. The second electronic module is electrically connected to the second terminal set. The first body and the second body are adaptable to be assembled together in the manner that the protruding portion is embedded in the recess. In the meantime, the first terminal set contacts the second terminal set so that the first electronic module is electrically connected to the second electronic module via the first terminal set and the second terminal set.

Based on the above, the first terminal set is disposed in the recess of the first body, and the second terminal set is disposed in the protruding portion of the second body and partially exposed by the protruding portion. Therefore, when the first body and the second body are combined through the engagement of the protruding portion and the recess, the electrical connection between them is also accomplished. Furthermore, since the first terminal is hidden in the recess, and the second terminal and the protruding portion are integrally formed, there is no unmatched shape or profile in the appearance. Thus, the appearance is enhanced to be more pleasing.

In order to make the aforementioned features and advantages of the invention more comprehensible, embodiments accompanying figures are described in detail below.

DESCRIPTION OF EMBODIMENTS

Figure 1:
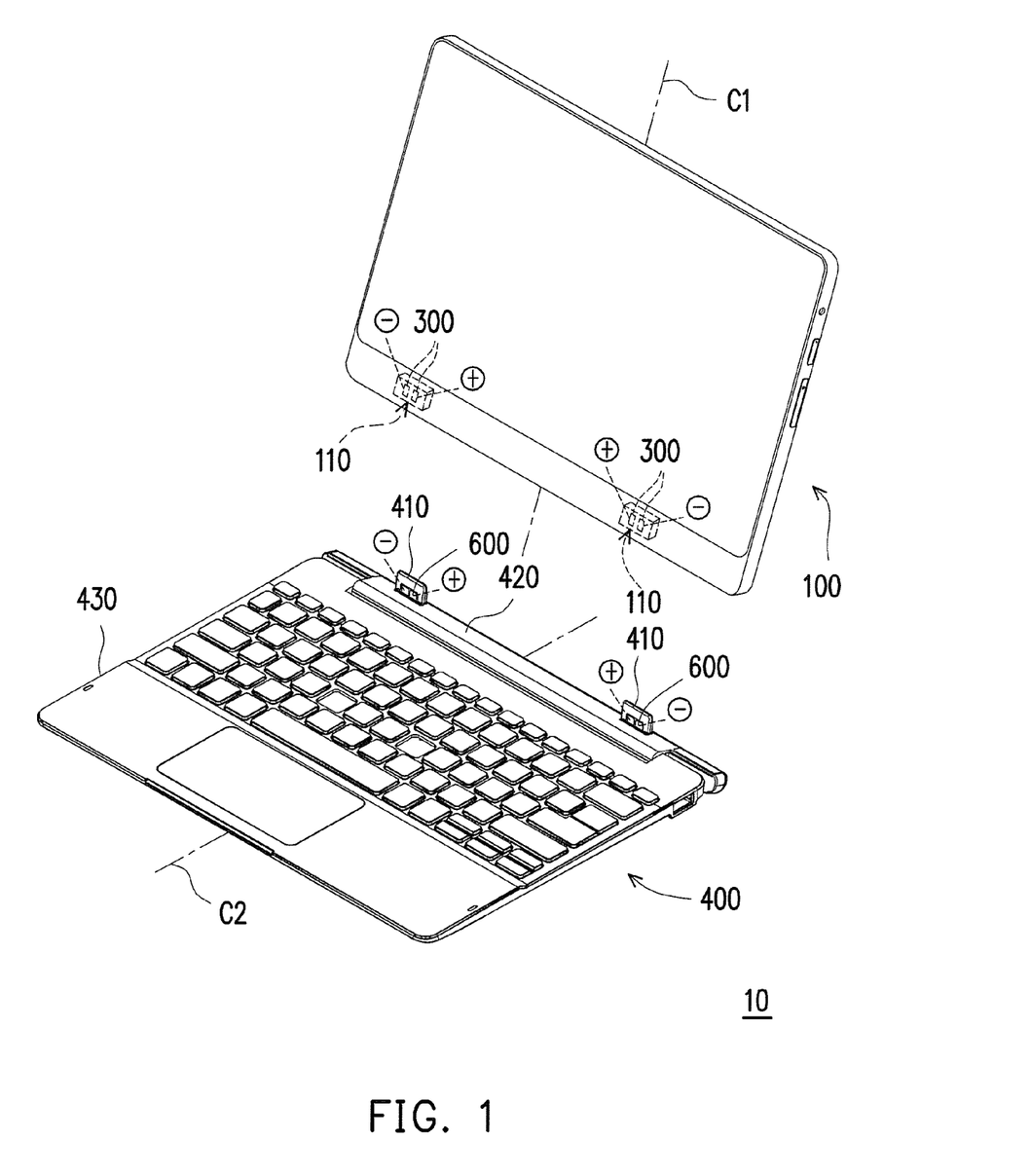
FIG. 1 is a schematic view illustrating construction of an electronic assembly according to an embodiment of the invention.
Figure 2:
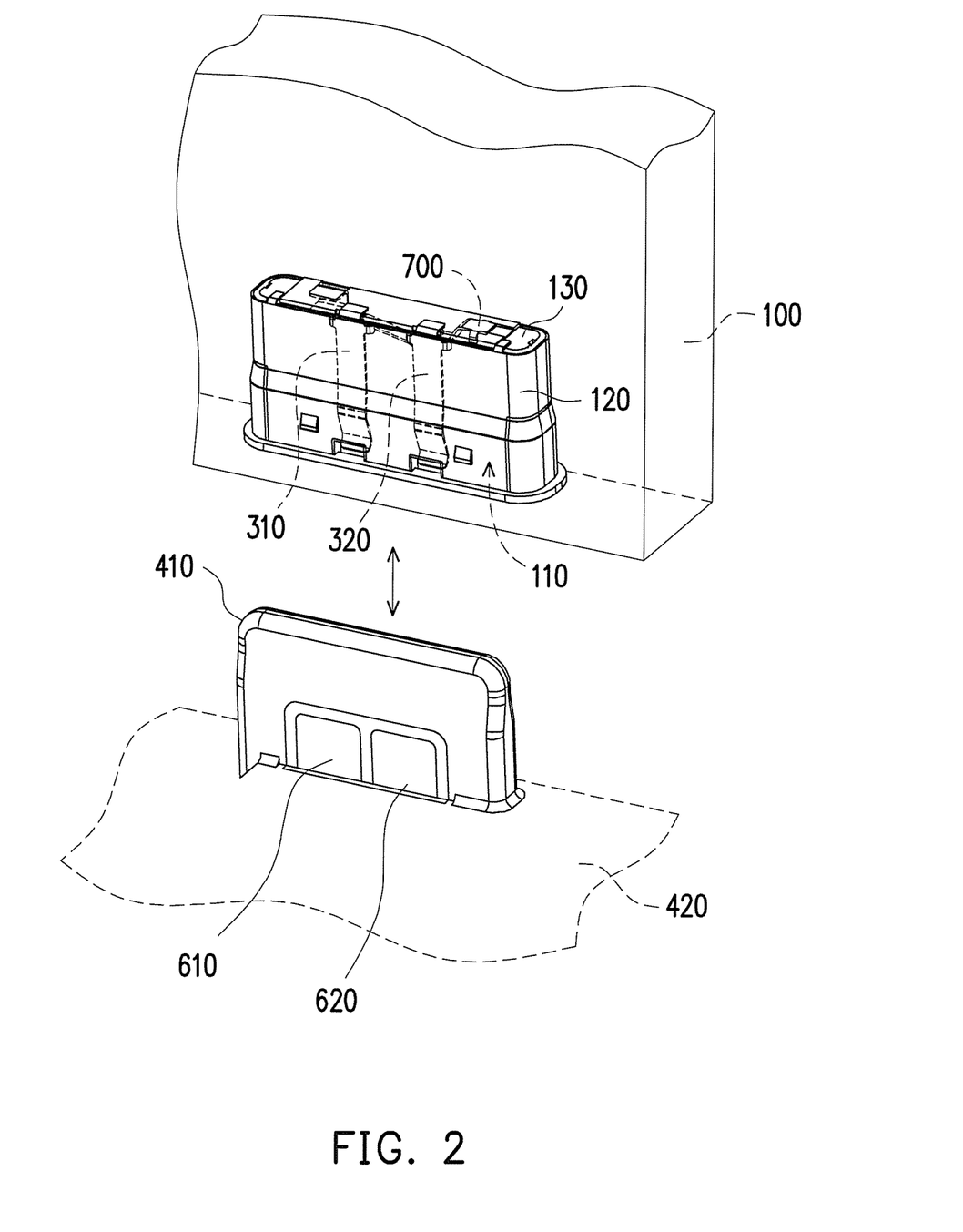
FIG. 2 is a partial schematic view illustrating the electronic assembly of FIG. 1.
Figure 3:
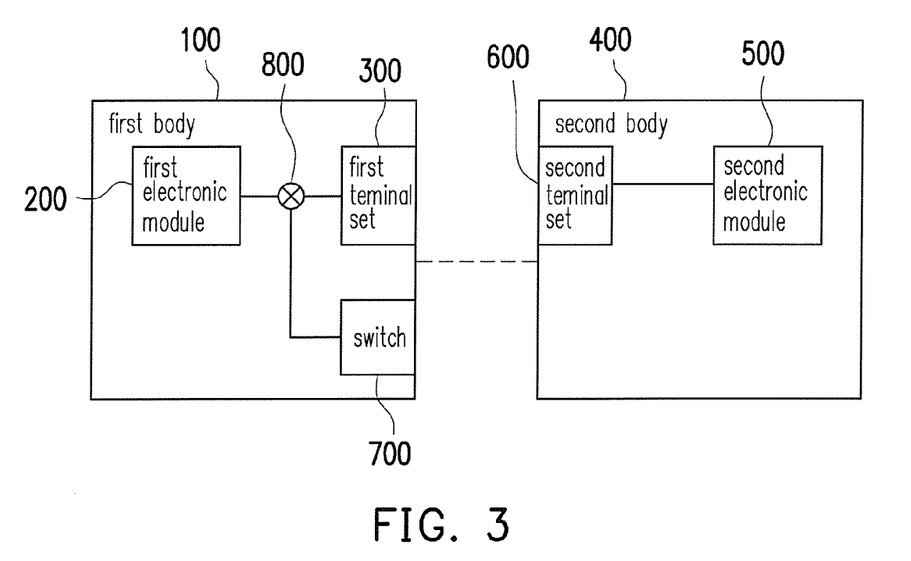
FIG. 3 is a schematic view illustrating electrical connection of the electronic assembly of FIG. 1.

FIG. 1 is a schematic view illustrating construction of an electronic assembly according to an embodiment of the invention. FIG. 2 is a partial schematic view illustrating the electronic assembly of FIG. 1. FIG. 3 is a schematic view illustrating electrical connection of the electronic assembly of FIG. 1. Please refer to FIGS. 1-3 at the same time. In the embodiment, an electronic assembly 10 includes a first body 100, a first electronic module 200, at least one first terminal set 300, a second body 400, a second electronic module 500 and at least one second terminal set 600. The first body 100 has at least one recess 110. The first electronic module 200 is disposed in the first body 100. The first terminal set 300 is disposed in the recess 110 and electrically connected to the first electronic module 200.

The second body 400 has at least one protruding portion 410, a base 430 and a supporting shaft 420, wherein the supporting shaft 420 is pivoted to one side of the base 430; the protruding portion 410 is disposed on the supporting shaft 420. The second electronic module 500 is disposed within the base 430 of the second body 400. The second terminal set 600 is disposed in the protruding portion 410 and is partially exposed by the surface of the protruding portion 410. The second electronic module 500 is electrically connected to the second terminal set 600. The first body 100 and the second body 400 are adaptable to be assembled together in the manner that the protruding portion 410 is embedded in the recess 110. Moreover, the first terminal set 300 contacts the second terminal set 600 so that the first electronic module 200 is electrically connected to the second electronic module 500 via the first terminal set 300 and the second terminal set 600.

It should be pointed out that, although the embodiment is described by using the tablet PC and a docking base having a keyboard as an example, the invention is not limited thereto. That is, any two electronic devices that can be combined together may achieve a structural and electrical connection in a smooth manner using the design of the invention.

In the embodiment, since the protruding portion 410 and the recess 110 are structurally complementary to each other, after the first body 100 is combined with the second body 400, the protruding portion 410 and recess 110 as well as the first terminal set 300 and the second terminal set 600 thereon are not visible in the appearance of the electronic assembly 10. In other words, the related elements that are used for structural and electrical connections in the invention are substantially hidden in the assembled electronic assembly 10. In addition, the second terminal set 600 and the protruding portion 410 are integrally formed, and therefore the appearance of the second body 400 does not look odd, which enhances the overall appearance. Accordingly, the first body 100 and the second body 400 of the embodiment may look simple and pleasant in appearance.

Figure 4:
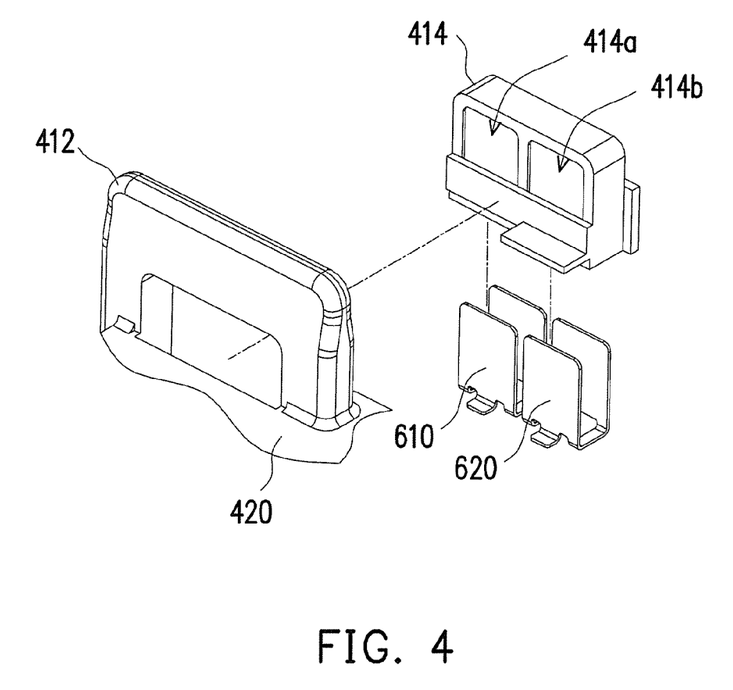
FIG. 4 is a partial explosive view illustrating a protruding portion of a second body of the electronic assembly of FIG. 1.

FIG. 4 is a partial explosive view illustrating a protruding portion of a second body of the electronic assembly of FIG. 1. Please refer to FIGS. 2-4 at the same time. As shown by FIG. 2, the recess 110 of the first body 100 consists of an inner wall 130 and a plurality of side walls 120. The side walls 120 are adjacent to a periphery of the inner wall 130. The first terminal set 300 (embedded in one of the side walls 120) is disposed in the recess 110. The first terminal set 300 includes terminals 310 and 320. Correspondingly, the protruding portion 410 consists of a conductive portion 412, an insulating portion 414 and a second terminal set 600. The second terminal set 600 includes terminals 610 and 620. Here, the terminals 610 and 620 shown by FIG. 4 are embedded in the insulating portion 414 and exposed by windows 414a and 414b. The insulating portion 414 is further embedded in the conductive portion 412 to form a structural shape as shown by FIG. 2. In other words, the insulating portion 414 is positioned between the second terminal set 600 and the conductive portion 412. In the meantime, the terminals 610 and 620 of the second terminal set 600 are also separated by the insulating portion 414. In the embodiment, the terminals 610 and 620, insulating portion 414 and the conductive portion 412 are a structure formed integrally, which may be fabricated via an insert injection molding method.

Likewise, the protruding portion 410 also has a similar and corresponding top portion and a plurality of side portions. The side portions are adjacent to a periphery of the top portion. The second terminal set 600 is positioned on at least one of the side portions. Portion of the terminals 610 and 620 that expose the protruding portion 410 by the side portions respectively correspond to the terminals 310 and 320 in the recess 110. Therefore, when the protruding portion 410 is inserted into the recess 110, the terminals 610 and 620 as well as the terminals 310 and 320 may correspondingly contact one another respectively, such that the first electronic module 200 and the second electronic module 500 can be electronically connected to each other via the first terminal set 300 and the second terminal set 600.

Figure 5:
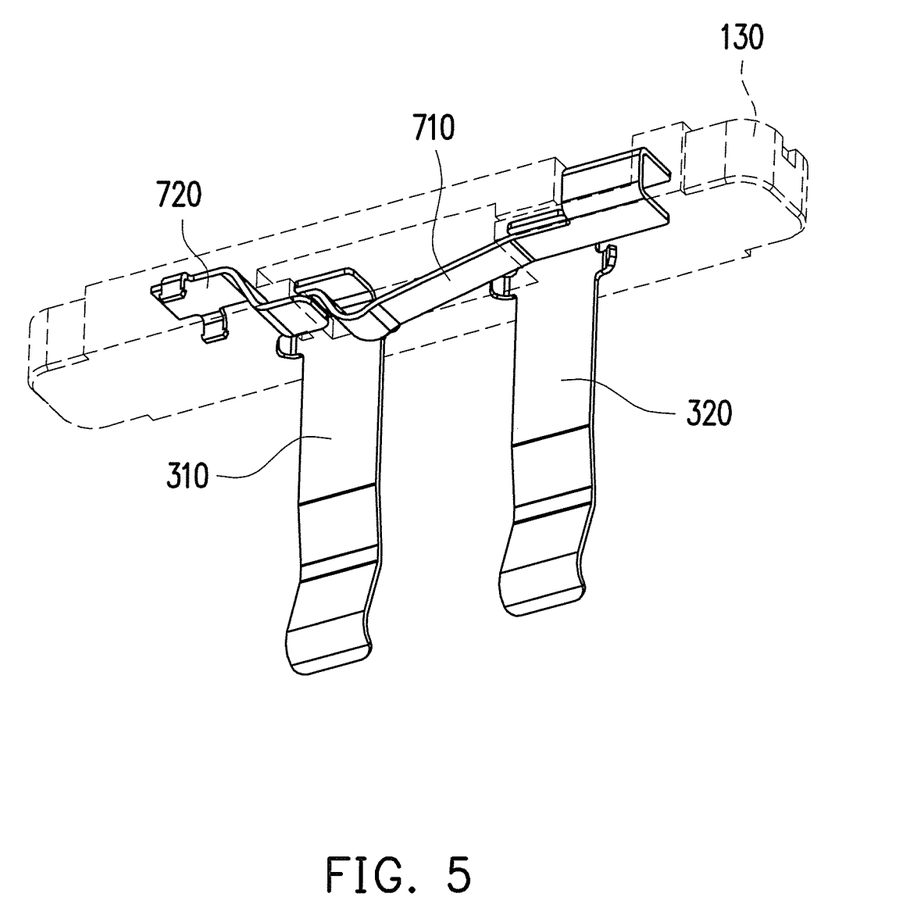
FIG. 5 is a partial schematic view illustrating a recess of a first body of FIG. 2.

FIG. 5 is a partial schematic view illustrating a recess of a first body of FIG. 2. Here, the schematic view is illustrated from another viewing angle and some components are omitted for ease of recognizing and describing the components to be described. Please refer to FIGS. 2, 3 and 5 at the same time. In the embodiment, the electronic assembly 10 further includes a switch 700 and a controlling unit 800, wherein the switch 700 is disposed on the inner wall 130 of the recess 110; the controlling unit 800 is disposed in the first body 100; the controlling unit 800 is electrically connected between the switch 700, the first electronic module 200 and the first terminal set 300. When the protruding portion 410 is embedded and fixed in the recess 110, the switch 700 is substantially positioned on a moving path of the protruding portion 410, such that a terminal end of the protruding portion 410 contacts the switch 700 to change the status of the switch 700.

Figure 6:
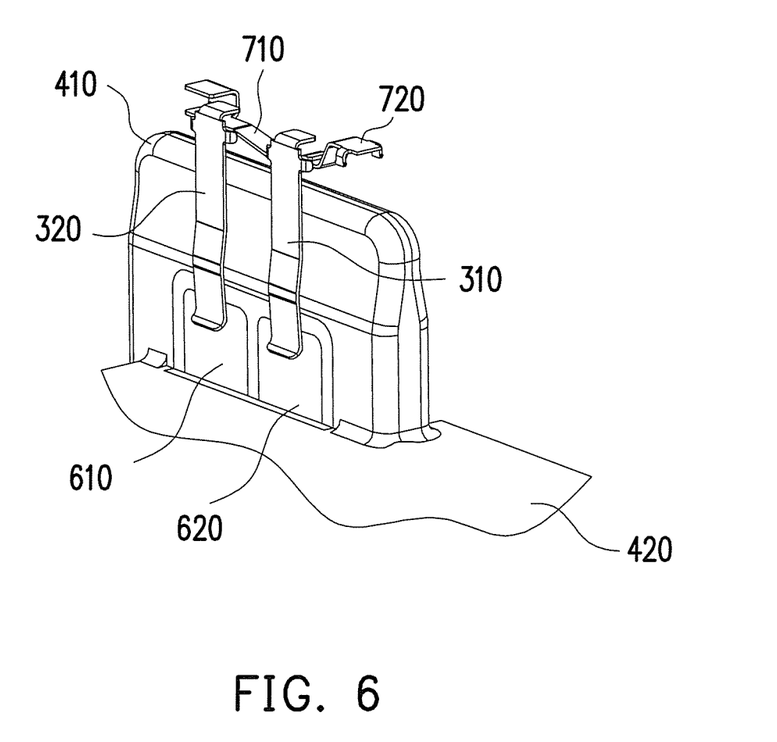
FIGS. 6-9 are schematic views illustrating different statuses of a switch.
Figure 7:
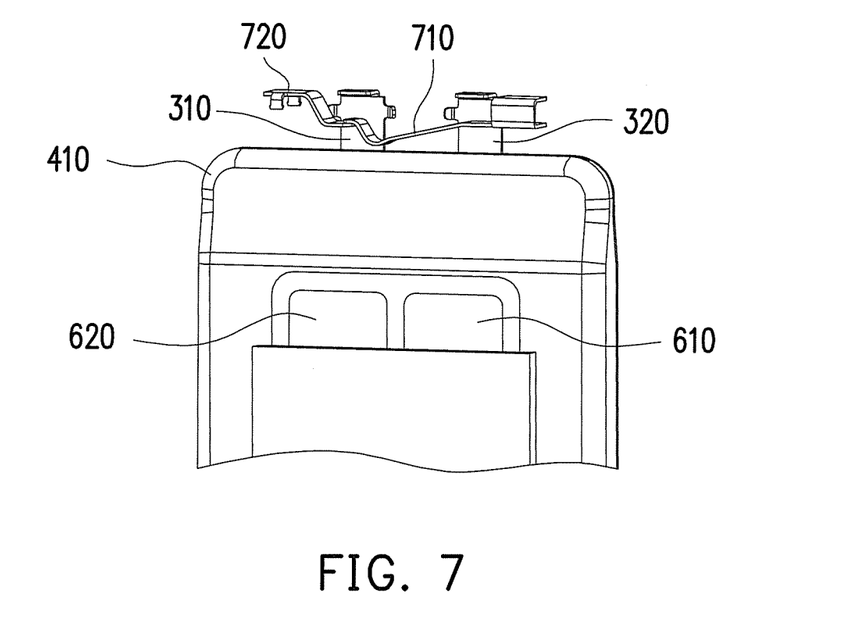
Figure 8:
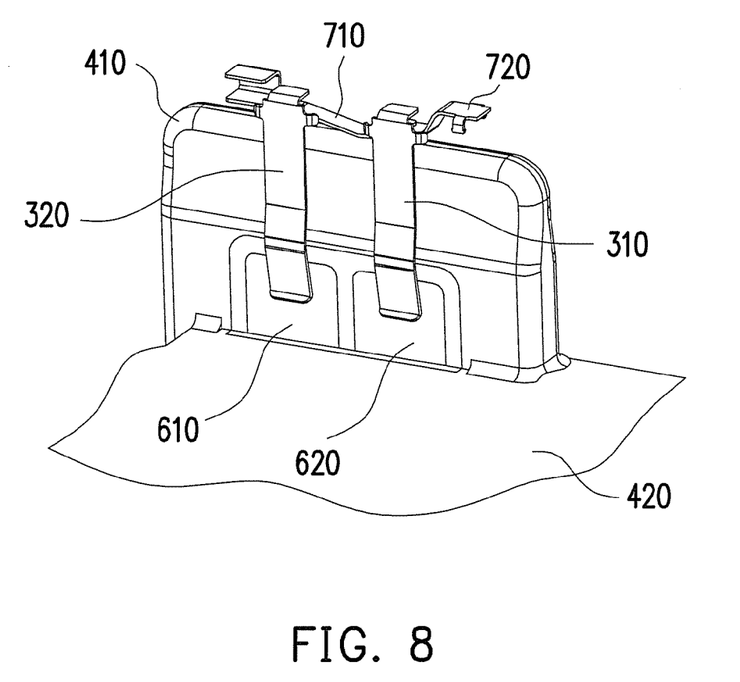
Figure 9:
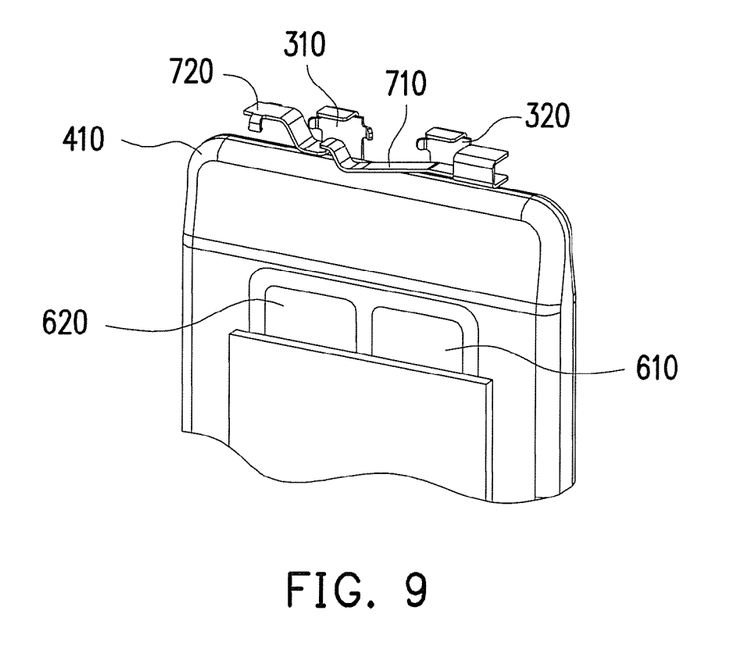

Here, the switch 700 in the embodiment is, for example, a lid switch including a first elastic-slice terminal 710 and a second elastic-slice terminal 720. As shown by FIG. 5, one end of the first elastic-slice terminal 710 and one end of the second elastic-slice terminal 720 are respectively embedded in the inner wall 130 and electrically connected to the controlling unit 800. The other end of the first elastic-slice terminal 710 and the other end of the second elastic-slice terminal 720 extend toward each other and movably overlap with each other. Accordingly, FIGS. 6-9 are schematic views illustrating different statuses of the switch, describing the corresponding relation between the protruding portion 410 and the switch 700 when the protruding portion 410 is inserted into the recess 110. FIGS. 6-7 illustrate the same status with a relative viewing angle. FIGS. 8-9 illustrate another status with a relative viewing angle.

Please refer to FIG. 3 and FIGS. 6-9. Since one end of the first elastic-slice terminal 710 and one end of the second elastic-slice terminal 720 are respectively electrically connected to the controlling unit 800, in the embodiment, when the protruding portion 410 does not contact the switch 700, the switch 700 is substantially in a mutually and electrically connected status. When the protruding portion 410 is moved into the recess 110 as shown by FIGS. 8-9, the terminal end of the protruding portion 410 contacts the first elastic-slice terminal 710 and further deforms the first elastic-slice terminal 710, such that a portion of the first elastic-slice terminal 710 that initially overlaps on the second elastic-slice terminal 720 is pushed away by the protruding portion 410. In that case, the switch 700 is in an electrically disconnected status; therefore, a triggering signal is generated to be transmitted to the controlling unit 800. Correspondingly, after the controlling unit 800 receives the triggering signal, the electrical connection between the first electronic module 200 and the first terminal set 300 is changed accordingly.

The presence of the switch 700 enables the electronic assembly 100 to allow the two bodies to be electrically connected after the structures thereof are connected. For example, when the first body 100 and the second body 400 are docked to each other via the protruding portion 410 and the recess 110, the first terminal set 300 and the second terminal set 600 contact each other. To avoid any possible danger that might happen due to electrical connection before the structures are not completely connected, the presence of the switch 700 serves as a security structure between the first body 100 and the second body 400. Please refer to FIGS. 6-7. When the protruding portion 410 is moved into the recess 110, the terminals 310 and 320 are in contact with the terminals 610 and 620. However, it should be noted that, at this time, the first elastic-slice terminal 710 does not contact the protruding portion 410; therefore, the controlling unit 800 still retains the status that the electronic connection between the first electronic module 200 and the first terminal 300 are closed. Once the protruding portion 410 is completely moved into and latched with the recess 110, the protruding portion 410 contacts the first elastic-slice terminal 710 and pushes the first elastic-slice terminal 710 away from the second elastic-slice terminal 720, enabling the switch 700 to provide the triggering signal to the controlling unit 800 so that the controlling unit 800 electrically connects the first electronic module 200 and the first terminal module 300 (i.e. at this time, the controlling unit 800 is driven to open the electronic connection between the first electronic module 200 and the first terminal 300). Such approach ensures that the bodies are not electrically connected before the structures of the bodies are completely connected.

Here, the descriptions concerning changing the status of the switch 700 refer to switching on or switching off the switch 700 so as for the switch 700 to generate the triggering signal to be transmitted to the controlling unit 800, allowing the controlling unit 800 to change the electrical connection between the first terminal set 300 and the first electronic module 200. In other words, the invention does not provide limitation to the initial status of the switch 700. The invention may include any construction that allows the status of the switch 700 to be changed by contacting the protruding portion 410 to the switch 700 so the controlling unit 800 knows the change of the status.

Additionally, it should be indicated that the embodiment provides no limitation to the configuration of the switch 700 in the electronic assembly 10. In another embodiment that is not shown, the switch is substantially disposed on the protruding portion 410 of the second body 400. The controlling unit is substantially disposed on the second body 400 and electrically connected between the switch 700, the second electronic module 500 and the second terminal set 600. During the process where the protruding portion 410 is moved into the recess 110, such configuration also allows the inner wall 130 of the recess 110 to contact the switch and changes the status thereof to generate the triggering signal to be transmitted to the controlling unit, such that the controlling unit changes the electrical connection between the second electronic module 500 and the second terminal set 600 to achieve the same effect described above.

Please further refer to FIG. 1. In the embodiment, the first body 100 substantially has a pair of recesses 110. The second body 400 substantially has a pair of protruding portions 410 which respectively correspond to the pair of recesses 110. The electronic assembly 10 includes a pair of first terminal sets 300 respectively disposed in the recesses 110, and a pair of second terminal sets 600 respectively disposed in the protruding portions 410, wherein anode terminals and cathode terminals of the first terminal set 300 are symmetrical relative to a first central line C1 of the first body 100. Moreover, a distance of the cathode terminal relative to the first central line C1 is larger than a distance of the anode terminal relative to the first central line C1 (please see marks "+" and "−" in FIG. 1). Correspondingly, anode terminals and cathode terminals of the second terminal set 600 are symmetrical relative to a second central line C2 of the second body 400. Moreover, a distance of the cathode terminal relative to the second central line C2 is larger than a distance of the anode terminal relative to the second central line C2.

After the first body 100 and the second body 400 are combined together, the first central line C1 and the second central line C2 are consistent with each other. More importantly, the anode terminals of the first terminal set 300 and the second terminal set 600 are positioned at an inner side while the cathode terminals are positioned at an external side. Accordingly, in the embodiment, there is no need to worry about the position where first body 100 is combined with the second body 400. In other words, no matter the first body 100 is connected with the second body 400 in a manner of facing each other or facing away from the second body 400 (i.e. take this embodiment as an example, the tablet PC may be connected with the docking base with its display surface facing the docking base or facing away from the docking base), the electrical connection between them is not affected, making a wide range of combinations possible.

Figure 10:
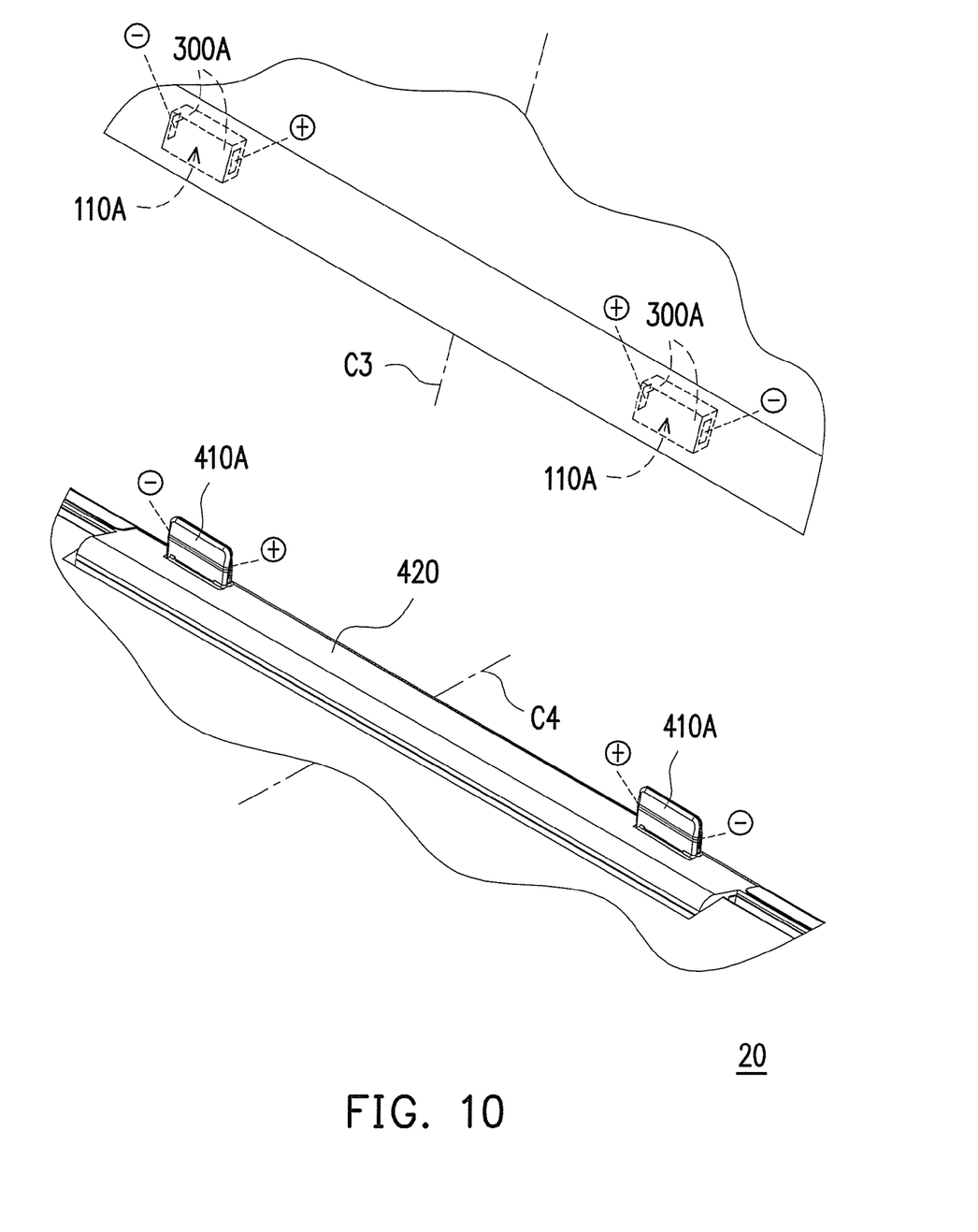
FIG. 10 is a partial schematic view illustrating an electronic assembly according to another embodiment of the invention.
Figure 11:
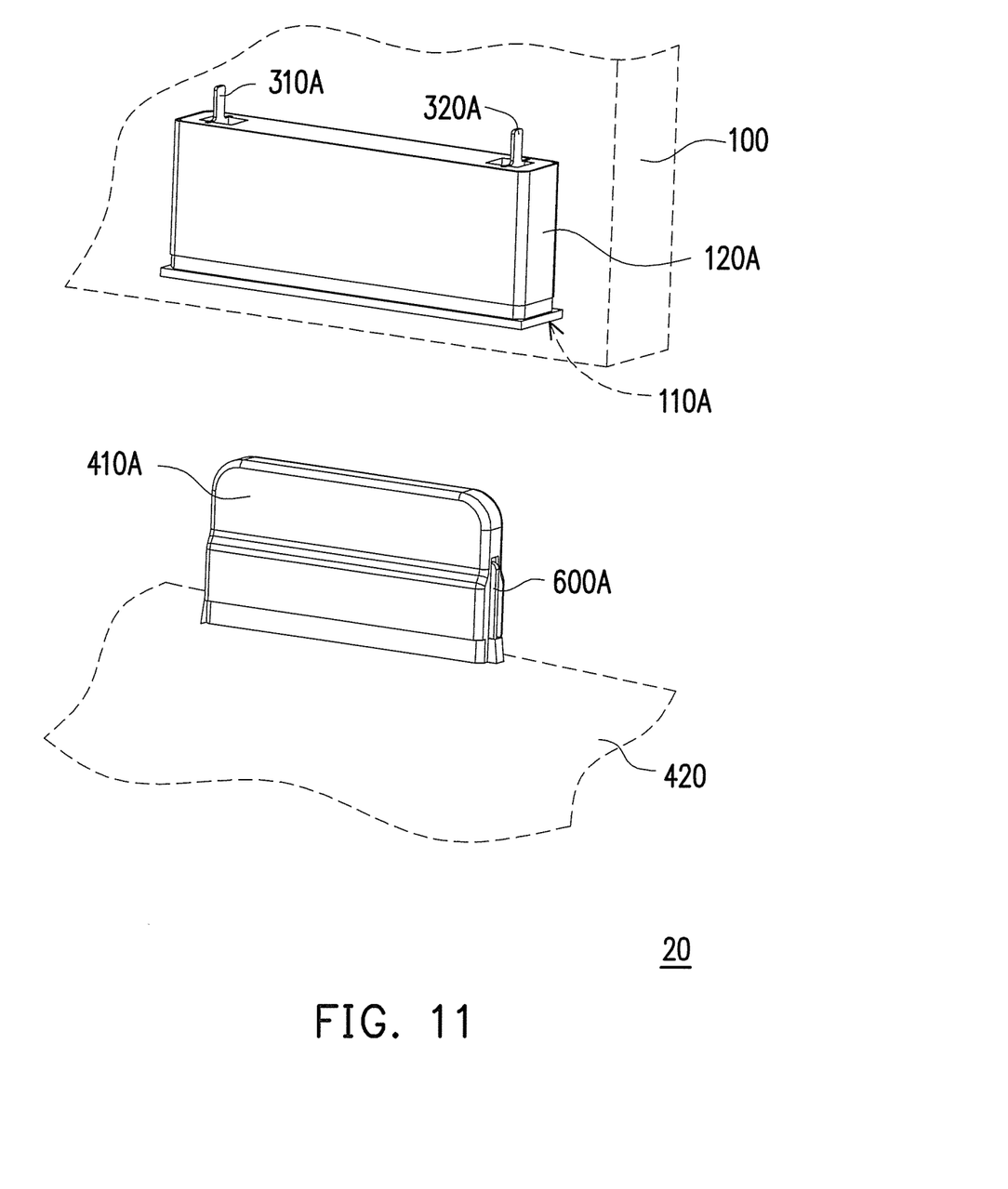
FIG. 11 is a partial enlargement view illustrating the electronic assembly of FIG. 10.
Figure 12:
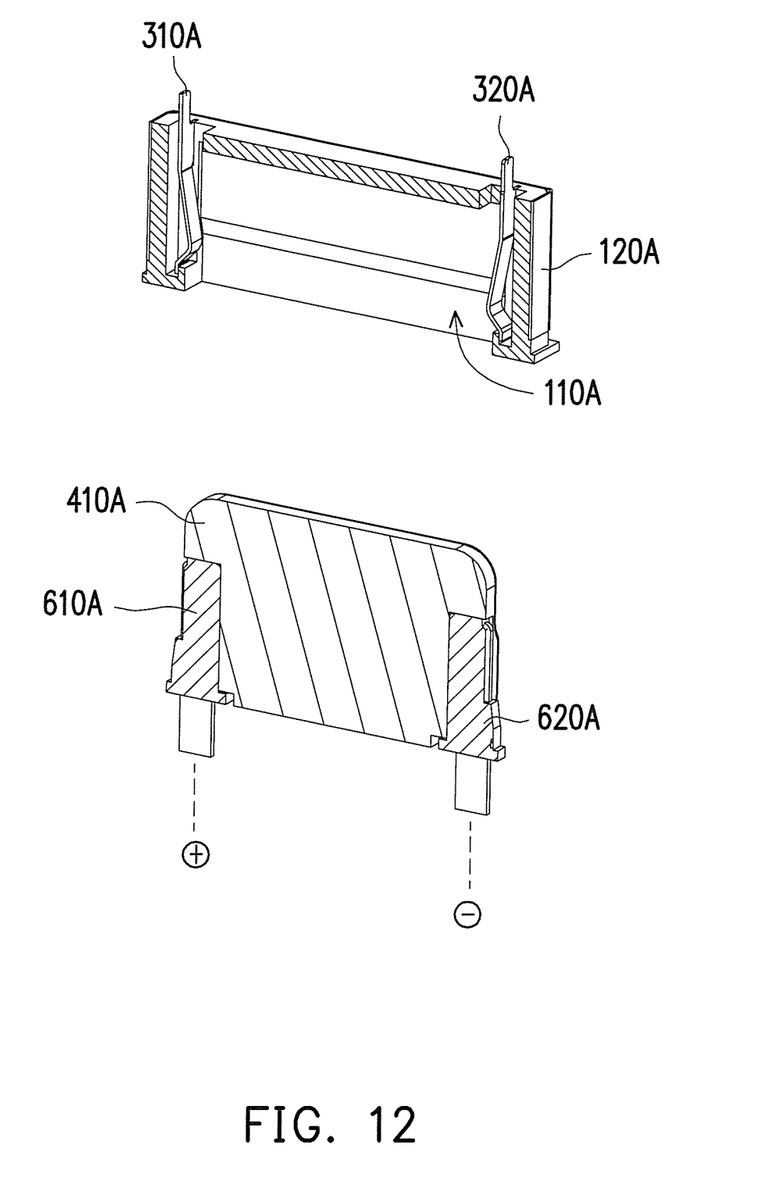
FIG. 12 is a sectional view illustrating related components of FIG. 11.

FIG. 10 is a partial schematic view illustrating an electronic assembly according to another embodiment of the invention. FIG. 11 is a partial enlargement view illustrating the electronic assembly of FIG. 10. FIG. 12 is a sectional view illustrating related components of FIG. 11. Please refer to FIGS. 10-12 at the same time. Different from the above embodiment, in an electronic assembly 20, terminals 310A and 320A of a first terminal set 300A are substantially disposed at two opposite side walls of a recess 110A. Terminals 610A and 620A of a second terminal set 600A are substantially embedded in two opposite side portions of a protruding portion 410A. The side wall and the side portion refer to a smaller portion of the protruding portion 410A and a smaller portion of the inner area of the recess 110A (whereas the terminals in the above embodiment are located in a larger portion). One of the first terminal set 300A and the second terminal set 600A consists of an elastic-slice terminal (as shown by FIG. 12; the descriptions are incorporated by using the terminals 310A and 320A of the first terminal set 300A as an example of the elastic-slice terminal). In that case, as described in the above embodiment, the first terminal set 300A is hidden in the recess 110A; terminals 610A as well as the 620A and the protruding portion 410A are formed integrally; only a portion of them is exposed by a side portion of the protruding portion 410A. Therefore, it also satisfies the need of keeping appearance simple.

Additionally, as indicated in the above embodiment, the anode terminal and the cathode terminal of the first terminal set 300A and the second terminal set 600A are in a symmetrical status relative to central lines C3 and C4. In the embodiment, such configuration not only allows the first body 100 to be connected with a supporting shaft 420 of the second body in the manner of facing each other or facing away from the second body, but also avoids danger of spark caused by the anode terminals that contact each other first when the first body 100 is obliquely connected with the second body.

Figure 13:
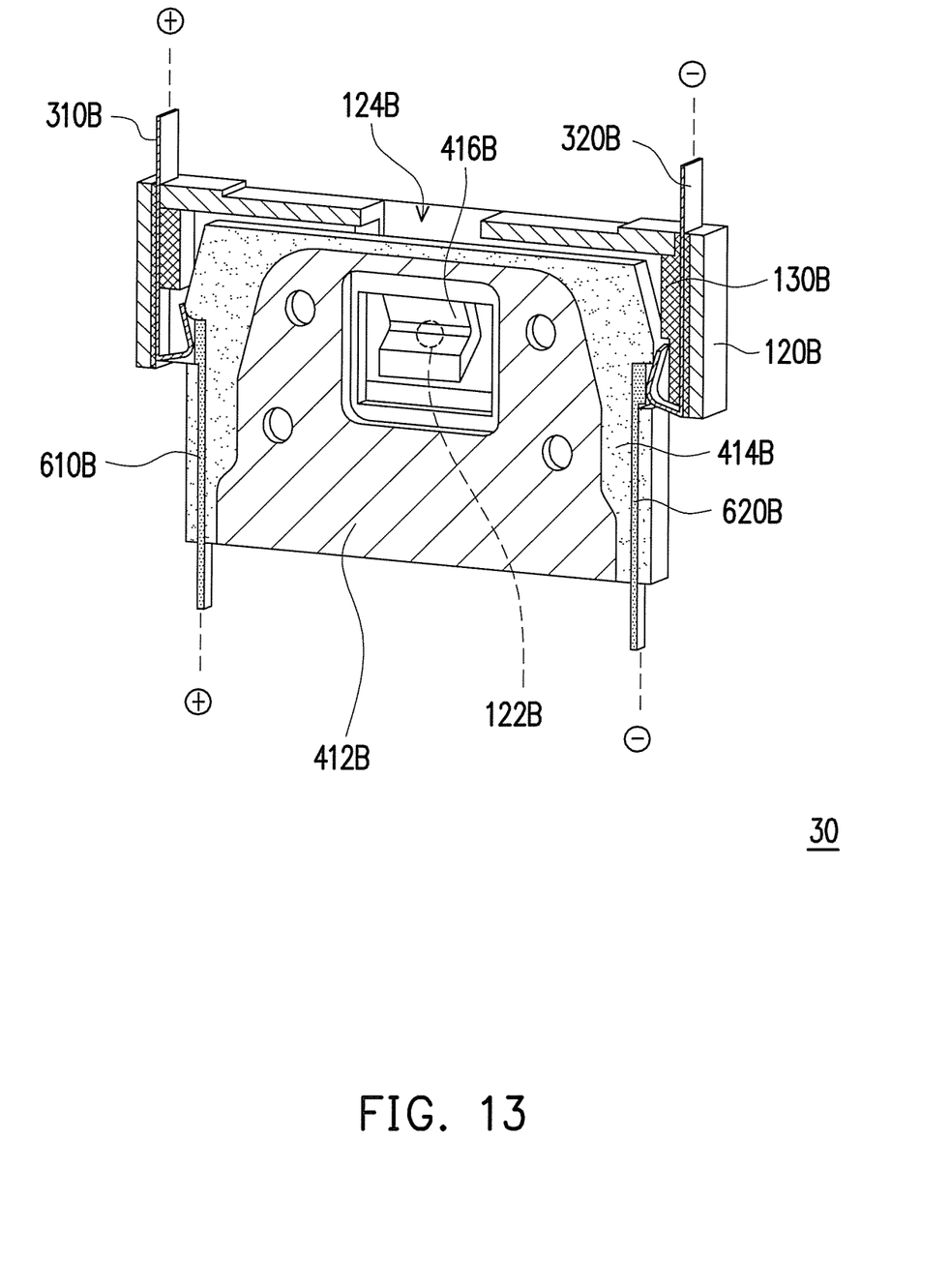
FIG. 13 is a partial sectional view illustrating an electronic assembly according to another embodiment of the invention.

FIG. 13 is a partial sectional view illustrating an electronic assembly according to another embodiment of the invention. Here, the schematic view shows a status where the two bodies are connected to each other. In an electronic assembly 30 of the embodiment, terminals 310B and 320B of the first terminal set are the same as the terminals 310A and 320A described in the above embodiment. Terminals 610B and 620B of the second terminal set are the same as the terminals 610 and 620A described in the above embodiment. The difference lies in that, a protruding portion 412B of the second body covers the conductive portion (shown by oblique sectional lines) via the insulating portion (shown by dotted sectional lines), such that the terminals 610B and 620B are located at opposite sides of the conductive portion but isolated from each other by the insulating portion. Likewise, in the recess structure of the first body, a side wall 120B also includes the conductive portion (shown by oblique sectional lines) and the insulating portion (shown by cross sectional lines). Terminals 310B and 320B are embedded in the insulating portion and isolated from the conductive portion.

Moreover, a protruding portion 412B also has an opening and a latching portion 416B disposed therein. The first body also has a latching point 122B on a side wall 120B of the recess. The cooperation of the latching portion 416B and the latching point 122B allows the protruding portion 412B to be fixed in the recess. Additionally, please refer to the switch 700 shown by FIG. 2. An identical switch structure may be disposed at a notch 124B in the embodiment to achieve the same effect described in the above embodiment.

In brief, in the above embodiments of the invention, the first terminal set is disposed in the recess of the first body. The second terminal set is disposed in the protruding portion of the second body and partially exposed by the protruding portion. Therefore, when the first body and the second body are combined with each other via the cooperation of the protruding portion and the recess, the two terminal sets may structurally contact each other.

In the meantime, the switch is further disposed in the inner wall of the recess so the protruding portion can completely enter the recess to contact the switch, whereby changing the conductive status of the switch to generate the triggering signal to be transmitted to the controlling unit and allowing the controlling unit to change the electrical connection between the electronic module and the terminal set. Such approach enhances security by ensuring that the controlling unit opens the electrical connection between the electronic module and the terminal set after the structures of the bodies are completely connected to each other.

Moreover, in the electronic assembly of the invention, since the first terminal is hidden in the recess, and the second terminal and the protruding portion are formed integrally, the shape and outline of the appearance do not look odd, allowing the structure of the invention to have a pleasing appearance.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. An electronic assembly, comprising:
a first body having at least one recess;
a first electronic module disposed in the first body;
at least one first terminal set disposed in the recess and electrically connected to the first electronic module;
a second body having at least one protruding portion;
a second electronic module disposed in the second body;
at least one second terminal set disposed in the protruding portion and partially exposed by a surface of the protruding portion, the second electronic module electrically connected to the second terminal set, the first body and the second body being assembled together in a manner that the protruding portion is embedded in the recess, and the first terminal set contacting the second terminal set such that the first electronic module and the second electronic module are electrically connected to each other via the first terminal set and the second terminal set; and
a switch disposed in the recess, wherein an end of the protruding portion contacts the switch directly to change the switch from an electrically connected status to an electrically disconnected status.

2. The electronic assembly according to claim 1, further comprising:
a controlling unit disposed in the first body, the controlling unit electrically connected between the switch, the first electronic module and the first terminal set, wherein the switch provides a signal to the controlling unit when the protruding portion is embedded in the recess and directly contacts the switch to change the switch from the electrically connected status to the electrically disconnected status such that the controlling unit electrically is connected to the first electronic module and the first terminal set.

3. The electronic assembly according to claim 1, wherein the switch is a ground terminal of the first terminal set, and the protruding portion contacts the ground terminal via a conductive portion.

4. The electronic assembly according to claim 1, wherein the recess comprises an inner wall and a plurality of side walls, the side walls are adjacent to a periphery of the inner wall, the protruding portion comprises a top portion and a plurality of side portions adjacent to a periphery of the top portion, the protruding portion is adaptable for being moved into the recess such that the inner wall corresponds to the top portion, and the side walls correspond to the side portions.

5. The electronic assembly according to claim 4, wherein the first terminal set is disposed on at least one side wall, or the first terminal set is disposed on the inner wall and the at least one side wall, the second terminal set is disposed on at least one side portion, or the second terminal set is disposed on the top portion and the at least one side portion.

6. The electronic assembly according to claim 5, wherein terminals of the first terminal set are disposed on the two opposite side walls, and terminals of the second terminal set are disposed on the two opposite side portions.

7. The electronic assembly according to claim 1, wherein the first body comprises a pair of recesses, the second body comprises a pair of protruding portions respectively corresponding to the recesses, the electronic assembly comprises:
a pair of first terminal sets respectively disposed in the recesses, the first terminal sets electrically connected to the first electronic module, wherein anode terminals of the first terminal sets are symmetrical to each other relative to a first central line of the first body, and cathode terminals of the first terminal sets are symmetrical to each other relative to the first central line of the first body; and
a pair of second terminal sets respectively disposed on the protruding portions, the pair of second terminal sets electrically connected to the second electronic module, wherein anode terminals of second terminal sets are symmetrical to each other relative to a second central line of the second body, and cathode terminals of second terminal sets are symmetrical to each other relative to the second central line of the second body, after the first body and the second body are combined together, the first central line and the second central line are consistent with each other so that the first body is connected with the second body in a manner of facing each other or facing away from the second body.

8. The electronic assembly according to claim 7, wherein, in the first terminal sets, a distance of the cathode terminal relative to the first central line is larger than a distance of the anode terminal relative to the first central line; in the second terminal sets, a distance of the cathode terminal relative to the second central line is larger than a distance of the anode terminal relative to the second central line.

9. The electronic assembly according to claim 1, wherein the protruding portion comprises an insulating portion and a conductive portion, the insulating portion is disposed between the second terminal set and the conductive portion.

10. The electronic assembly according to claim 9, wherein one of the first terminal set and the second terminal set consists of an elastic-slice terminal.

11. The electronic assembly according to claim 9, wherein the conductive portion is disposed at a terminal end of the protruding portion.

12. The electronic assembly according to claim 9, wherein the protruding portion comprises a plurality of side surfaces, the conductive portion is exposed by a pair of the opposite side surfaces, and the second terminal set is exposed by another pair of the opposite side surfaces.

13. The electronic assembly according to claim 9, wherein terminals of the second terminal set are embedded in the insulating portion and exposed by corresponding windows formed on the insulating portion, and the insulating portion is embedded in the conductive portion.

14. The electronic assembly according to claim 9, wherein the protruding portion of the second body covers the conductive portion via the insulating portion, the protruding portion has an opening and a latching portion disposed therein, the first body has a latching point on a sidewall of the recess, and the protruding portion is fixed in the recess by aligning the latching portion with the latching point.

* * * * *